May 16, 1967
J. J. DIGBY
3,319,755
STARTER CLUTCH DEVICE WITH CENTRIFUGAL
CLUTCH SEPARATING MEANS
Filed Feb. 8, 1965
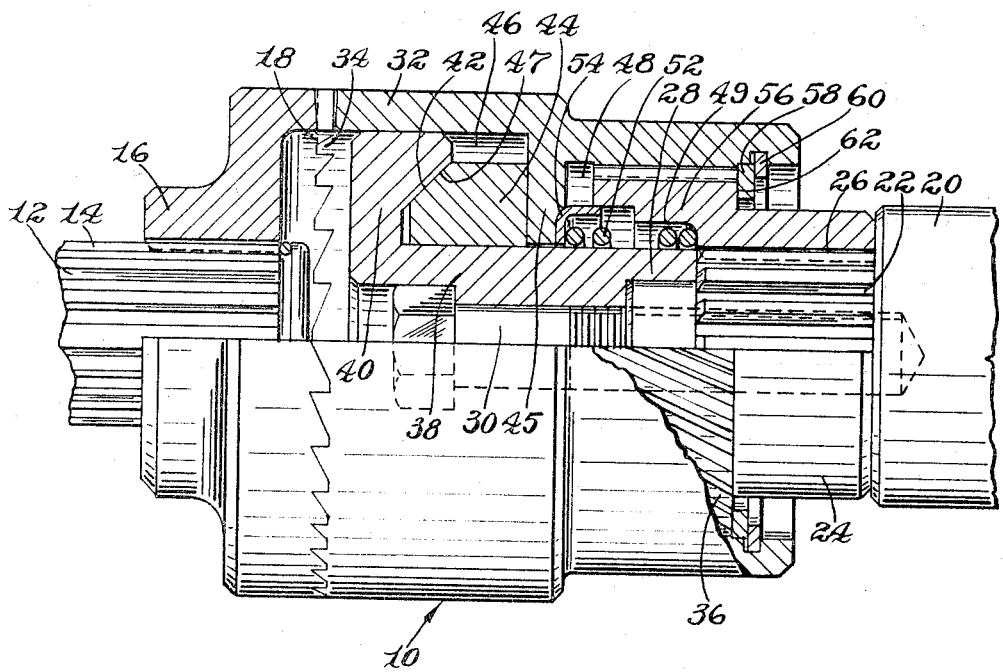
WITNESS:
Esther M. Stockton
INVENTOR.
James J. Digby
BY
W. S. Thompson
ATTORNEY

United States Patent Office 3,319,755
Patented May 16, 1967

3,319,755
STARTER CLUTCH DEVICE WITH CENTRIFUGAL CLUTCH SEPARATING MEANS
James J. Digby, Elmira, N.Y., assignor to The Bendix Corporation, Elmira, N.Y., a corporation of Delaware
Filed Feb. 8, 1965, Ser. No. 430,917
3 Claims. (Cl. 192—104)

The present invention relates to an automatic starter clutch and more particularly to a starter clutch device having improved centrifugally-actuated means for disengaging clutch members after an engine start.

It is an object of the present invention to provide an improved starter clutch disengaging device having automatic means for separating clutch teeth after engine start-up which is simple, reliable and relatively inexpensive to manufacture.

It is another object of the present invention to provide an improved starter drive having centrifugal weights and a spring bias means for engaging and disengaging dentil clutch teeth after engine start-up to prevent clutch over-run and the accompanying deleterious wear.

It is another object of the present invention to provide a relatively friction-free means for engaging and disengaging clutch teeth after engine start-up.

It is still a further object of the present invention to eliminate all connection between the driven and the driving parts of the starter clutch assembly so that once start-up is attained, there is no force tending to rotate the driving member, thereby preventing damage to the driving member motor.

The drawing depicts a clutch mechanism for an engine, generally designated by numeral 10, mounted on a drive shaft 12 of a starting motor (not shown). The drive shaft is splined as at 14 to a driving clutch member 16 having clutch teeth or dentils 18 formed on one transverse face thereof. A driven clutch 32 has clutch teeth or dentils 34 for engaging the driving clutch. The driven shaft 20 is mounted on an engine to be started (not shown) and is connected to the starter device by spline 22. A collar 24 has mating splines at 26 which engage splines 22 of the driven shaft. A shaft extension member 28 is connected to the driven shaft by the bolt connection indicated at 30. The driven clutch 32 is helically splined at 36 to the collar 24 to permit limited axial movement of the driven clutch.

The shaft extension member 28 consists of an axial projection 38 having an annulus 40 on one end. The annulus has a first oblique face 42.

A plurality of annular weights 44, each having a second oblique face 47, slide on the first oblique face 42 and the radial projection 45 of the driven clutch within a first cavity 46.

Within a second cavity 48, formed by the radial projection 45 of the driven clutch 32, an axially-extending annulus 56 of the collar 24 is fitted which further contains recess 49 containing an axially-extensible spring 52 which tends to force the driven clutch away from the collar into engagement with the driving clutch. A retainer cup 54 abuts the radial projection 45 of the driven clutch.

An annular abutment ring 58, slidable with respect to the collar, is fastened to the driven clutch by a split ring 60 to limit axial movement of the driven clutch in the clutch engaged direction by cooperating with a radially-outwardly-extending projection 62 of the collar. It is desirable to limit clutch engagement by contact of abutment ring 58 and projection 62 to prevent full bottoming of clutch teeth 18, 34 to avoid applying axial thrust to the driving clutch which would in turn be transmitted to starting motor or starting motor bearings. In the clutch disengaged direction, axial movement is limited when the radial projection 45 of the driven clutch contacts the outermost end of the collar.

If this device were initially at rest, the dentils 18, 34 of the driving and driven clutches would be engaged due to the bias force of the spring 52. As the drive shaft gains speed (started motor accelerated), the centrifugal weights gain speed and move radially outwardly. The centrifugal weights, when moved outwardly, are forced axially to the right, as viewed in the drawing by oblique surfaces 42, 47, thus forcing radial projection 45 and the driven clutch to the right in a clutch disengaged direction against the bias of spring 52. Because of the inertia of the weights, a momentary overspeed of the driven clutch will not disengage the dentils. When the proper choice is made between spring strength and weight, size, shape and mass, the disengagement speed can be precisely fixed. It is preferred to establish this predetermined speed above starting motor cranking speed so as not to interfere with starting operation but below engine idle or self-operating speed to avoid continuous overrunning and clashing of the clutch teeth.

The present invention accomplishes positive clutch disengagement at engine start-up speed by moving the overspeeding driven clutch away from the driving clutch. When clutch disengagement is achieved, there is no further contact between the driving and the driven clutch until the engine is ready for the next start. The starter clutch device disclosed herein eliminates all friction connection between the high speed engine shaft and components mounted thereon and the starter drive shaft once a true engine start is obtained. Prolonged clutch tooth overrun is prevented. In addition, there is no risk of damage to the starter motor from unwanted rotation of the drive shaft. The bias spring, in addition to reengaging the clutch parts when the engine has stopped, forces contactive engagement between the weights and oblique surface 42 and the extension 45.

The automatic disengaging mechanism is entirely self-contained and may be joined to any matching starter drive shaft.

The device disclosed is relatively inexpensive to manufacture and assemble. It produces practical disengagement at a precisely predetermined speed. The device will be long-lasting and trouble-free because of the lack of frictional wear between the parts.

Those skilled in the art can readily understand that the driven collar, axial extension and the driven shaft may be one member. The driven clutch can be axially slidable inside of the collar rather than outside as shown. The resilient means could be rubber or some other elastically-deformable material. Doubtlessly, many other possible variations will occur to those skilled in the art.

The present invention is not limited to the details of construction and arrangement of parts shown in the drawing nor to the preceding description. The invention is capable of various other embodiments and of being practical in various ways without departing from the scope or spirit thereof.

I claim:
1. In a starter clutch device comprising:
   a drive shaft member;
   a driving clutch member splined thereto;
   a driven clutch member having means for operatively engaging said driving clutch member;
   a radially-inwardly-extending projection on said driven clutch member forming a first and second cavity inside of said driven clutch member;
   a driven shaft member;
   a collar member splined to said driven shaft member;
   said collar member shaped to form an annular recess around said driven shaft;
   said driven clutch member axially slidable relative to said driven collar;

an extension member projecting axially from said driven shaft toward the driving clutch member and connected to said driven shaft;

said extension member having an annulus extending radially outwardly;

said radial annulus having a first surface inclined obliquely;

said first cavity defined in part by the said extension member and by said radially-extending annulus;

a plurality of weights within said first cavity each having a second face inclined obliquely and slidably engaging said first surface, each of said weights slidably contacting said projection;

said weights capable of moving radially responsive to the angular velocity of said driven shaft operative to disengage said driven clutch member from said driving clutch member by forcing said projection apart from said radial annulus;

a retainer cup member mounted concentrically with said extension;

an axially-extensible spring member concentric to said extension in said second cavity, abutting said retainer cup member and said collar; and means for limiting the axial translation of said driven clutch member.

2. In a starter clutch device comprising:

a driving clutch member;

a driven clutch member having means for operatively engaging said driving clutch member;

a radially-inwardly-extending projection on said driven clutch member forming a first and second cavity inside of said driven clutch member;

a driven shaft means;

said driven shaft means shaped to form an annular cavity;

said driven clutch axially slidable upon said driven shaft means;

an extension member projecting axially from said driven shaft toward the driving clutch member through said first cavity and connected to said driven shaft;

said extension member having an annulus extending radially outwardly;

said radial extending annulus having a first surface inclined obliquely;

said first cavity defined in part by the said extension member, by said radially-extending annulus;

a plurality of weights within said first cavity each having a second face inclined obliquely and slidably engaging said first surface, and each of said weights slidably contacting said projection;

said weights capable of moving radially responsive to the angular velocity of said driven shaft and operative to disengage said driven clutch member from said driving clutch member by forcing said projection apart from said radial annulus;

an axially-extensible spring member concentric with said extension in said second cavity abutting said projection and said collar; and means for limiting the axial translation of said driven clutch member.

3. In a starter clutch device comprising:

a driving clutch member;

a driven clutch member having means for operatively engaging said driving clutch member;

a radially-inwardly-extending projection on said driven clutch member forming a first and second cavity inside of said driven clutch member;

driven shaft means;

said driven shaft means shaped to form an annular cavity, said driven clutch member axially slidable upon said driven shaft means;

said driven shaft means having an annulus extending radially outwardly through said first cavity;

said radially-outwardly-extending annulus having a first surface inclined obliquely;

said first cavity defined in part by said radially-extending annulus and by said projection;

a plurality of weights within said first cavity each having a second surface inclined obliquely and contactably engaging said first surface, each of said weights slidably contacting said projection;

an axially-extensible spring member concentric with said extension in said second cavity, biasing said driven clutch member relative to said driven shaft;

said weights operative to overcome said spring bias to disengage said driven clutch member; and means for limiting the axial translation of said driven clutch member.

References Cited by the Examiner

UNITED STATES PATENTS

| 2,464,675 | 3/1949 | Dodge | 192—104 |
| 2,554,445 | 5/1951 | Miller | 192—104 X |
| 2,587,712 | 3/1952 | Dodge | 192—103 |
| 2,625,826 | 1/1953 | Metzger | 192—104 X |
| 2,919,001 | 12/1959 | Miller | 192—104 |
| 2,937,731 | 5/1960 | Smith | 192—104 |
| 2,939,562 | 6/1960 | Miller | 192—104 |

BENJAMIN W. WYCHE, III, *Primary Examiner.*

DAVID J. WILLIAMOWSKY, *Examiner.*